United States Patent [19]
Ahl

[11] 3,770,068
[45] Nov. 6, 1973

[54] CONCRETE WEIGH BRIDGE
[75] Inventor: Nils Goran Ahl, Vasteras, Sweden
[73] Assignee: Transcale AB, Vasteras, Sweden
[22] Filed: Sept. 13, 1972
[21] Appl. No.: 288,747

[30] Foreign Application Priority Data
Sept. 14, 1971 Sweden.............................. 11662/71

[52] U.S. Cl. ............................................. 177/134
[51] Int. Cl............................................ G01g 19/02
[58] Field of Search ..................... 177/134–136, 255

[56] References Cited
UNITED STATES PATENTS
3,266,585  8/1966  Boadle............................ 177/134 X 3,533,481  10/1970  Paelian ............................ 177/134

FOREIGN PATENTS OR APPLICATIONS
221,756  10/1958  Australia............................ 177/134
440,703  10/1948  Italy................................... 177/134

Primary Examiner—George H. Miller, Jr.
Attorney—Hal D. Cooper et al.

[57] ABSTRACT

A weigh device having a platform comprised of a pre-stressed concrete beam of T—T cross sectional design with two cross beams supporting the concrete beam on a plurality of discrete load sensing devices.

11 Claims, 11 Drawing Figures

PATENTED NOV 6 1973

CONCRETE WEIGH BRIDGE

This invention relates to weighing devices and, more particularly, to a platform scale in which the weigh bridge or platform is constructed of a prestressed concrete beam design.

It is well known in the weighing art to fabricate platform scales entirely from steel. However, the cost for such scales is considerable and they do not lend themselve to assembly line production. Moreover, because of the substantial cost and the specialized design of each installation, it is impractical to maintain an inventory of such scales. Further, platform scales of this type require regular maintenance which make the installation relatively expensive to operate.

It is also known in the weighing art to manufacture platforms from both steel and concrete. With this type of construction, a concrete top or surface is installed on top of a steel structure. However, this design has the drawback that the concrete increases the weight of the platform without any gain in the strength of the platform. Moreover, the increase in tare weight may, in some cases, necessitate the selection of larger load cells than would be required with an all steel platform construction. Further, since platforms of the construction are usually made by pouring the concrete on the scale site, this design also does not lend itself to assembly line production.

Another known technique for building platform scales is to build a mold and pour an all concrete platform scale on the desired site. This type of construction is especially suitable for scales for weighing trucks. However, an all concrete platform scale is considerably heavier than the live load which is to be weighed which, in turn, means that larger load cells are required than those which would be required, for instance, where an all steel scale is used. The use of larger load cells affects the temperature stability and signal-to-noise level so that the overall accuracy of such an installation is reduced and the cost is very high.

It is a primary objective of this invention to provide a platform scale which overcomes the foregoing problems and which is of low cost, has good strength properties, has a low tare weight, low operating cost and which lends itself both to assembly line production and stocking of an inventory from which platforms may be shipped on order.

These objectives, as well as others, are achieved by providing a platform scale manufactured from prestressed concrete and consisting of prefabricated units which are provided with cross beams at either end thereof for cooperating with load cells or force transmitting means. If desired, the prefabricated units or modules may be provided with appropriate mounting means for use with check rods or other guides for restricting horizontal movement of the platform. In the preferred form of the invention, the prestressed concrete units are of a T—T cross sectional configuration with longitudianl prestressing elements arranged in the lower part of the platform and rated for maximum allowable load on the unit. The prefabricated units may also be provided with transverse and/or longitudinal reinforcement, which also may be prestressed, and which are rated for maximum allowable wheel loading. Still further, the units can be constructed with a substantial volume of voids in order to minimize the relation between tare weight and the maximum rated load of the installation.

These objects and features of the invention, as well as others, will be more apparent upon a complete reading of the following description which, together with the attached drawings, discloses but certain preferred forms of the invention.

Referring now to the drawings wherein like reference numerals indicate like parts in the various views:

FIG. 1b is a longitudinal sectional view along line A—A of FIG. 1a;

FIG. 3 is an elevational view, partly in section, of a scale installation using a platform of the type illustrated in FIG. 1a;

Figure 1A:
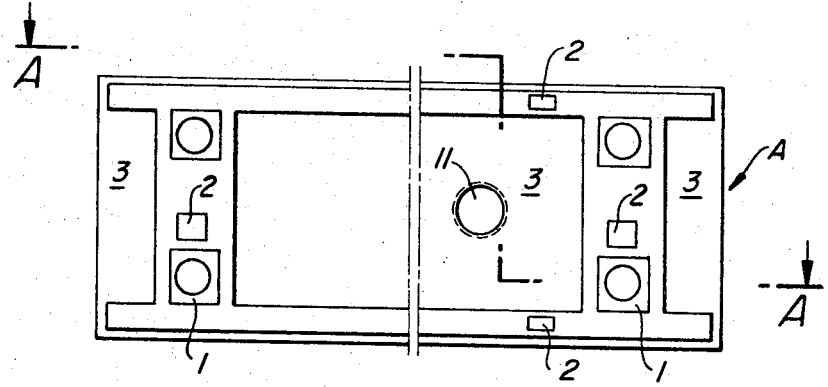
FIG. 1a is a plan view of a platform scale constructed in accordance with this invention.
Figure 1B:
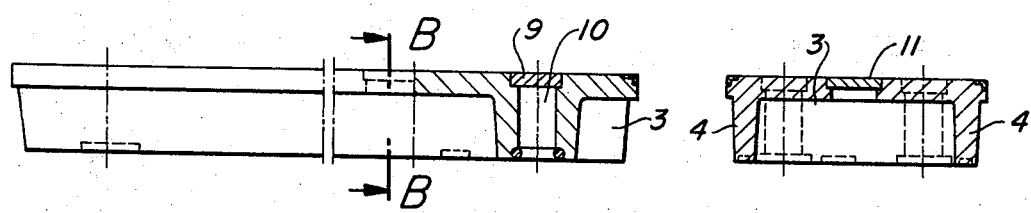
Figure 1C:
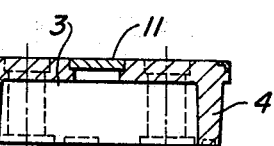
FIG. 1c is a sectional view along line B—B of FIG. 1b.

Referring now more in detail to the drawings, FIG. 1 illustrates a platform constructed in accordance with this invention and which consists of a prefabricated or modular unit, indicated generally by the reference A, of standardized length and width. The unit A is made from pressurized concrete and is provided with mounting plates 1 for cooperation with suitable load cells and mounting devices 2 for check rods or similar devices. Voids or recesses 3 may be cast into the unit, as is apparent from FIGS. 1a and 1c. These voids 3 serve to define longitudinally extending main beams 4 which provide the necessary rigidity against bending deflection while the large volume of void space substantially decreases the weight of the platform.

Openings 10, which extend through the platform unit A, may be provided for access to the load sensors from the upper part of the platform when a cover 9 is removed. A manhole 11 may also be formed in the platform unit to facilitate inspection of the underside of the platform.

Figure 2A:
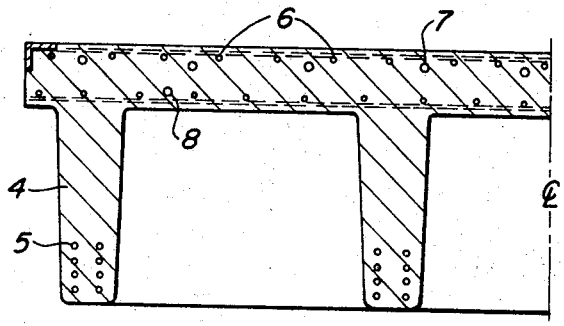
FIG. 2a is a fragmentary sectional view of a platform scale constructed in accordance with this invention and in which the prestressing elements are arranged in the lower part of the longitudinal beams.

As stated previously, the platform unit A may be of a prefabricated or modular construction, made from prestressed concrete. FIG. 2a illustrates one embodiment of such a prestressed concrete unit in which longitudinal main beams 4 are arranged in the lower part of the platform with each beam defining a T shaped cross section. Each of the main beams has prestressing elements 5 arranged in the lower part thereof to provide a maximum bending prestress on the unit. The platform may be further reinforced in its upper part by means of lengthwise and transverse reinforcing bars 6. If desired, the bars 6 may also be prestressed. The upper part of the platform may also be provided with openings or conduits 7 to accommodate electric heating elements and conduits 8 for electric connections to the load sensors.

Figure 2B:
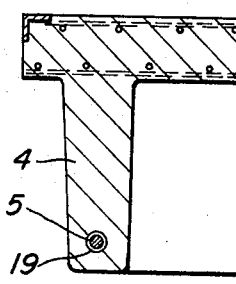
FIG. 2b is a fragmentary sectional view similar to FIG. 2a illustrating a concrete platform in which the concrete is stressed after being poured.

FIG. 2b shows another emobidmemt of prefabricated concrete platform in which the longitudinal main beams of the platform are provided with longitudinal holes or conduits 19 in which prestressing elements 5 may be inserted. With this arrangement, the prestressing elements 5 are tensioned after the concrete has set. It will be appreciated that although only one prestressing element has been shown, a plurality of such elements may be used if desired.

Figure 3:
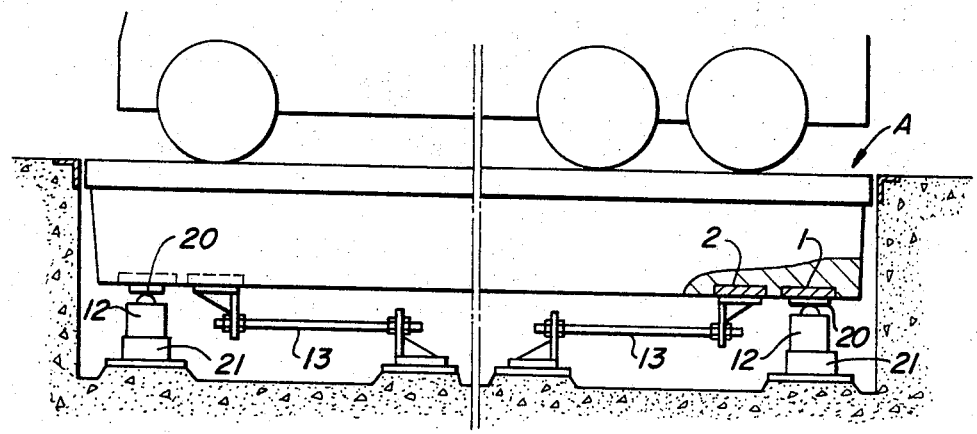

FIG. 3 illustrates a platform scale installation in which a platform constructed in the manner above-described is supported by load cells 12. Check rods 13 cooperate with the mounting devices 2 for restricting horizontal movement of the platform unit A. The mounting plates 1 cooperate with force transmitting means 20. Each load cell acts on a device 21 which allows a certain horizontal movement between the load cell and the foundation which may result from, for example, temperature expansion in the platform.

Figure 4:
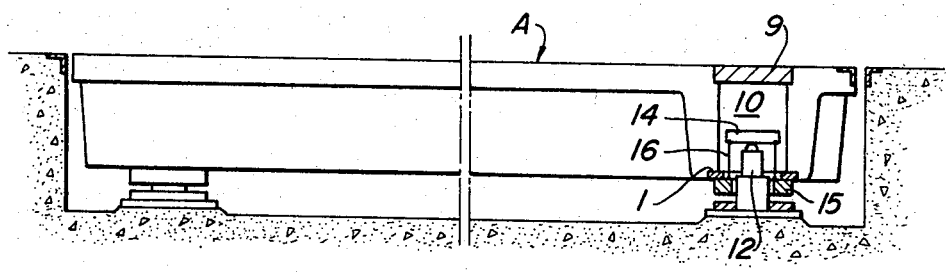
FIG. 4 is an elevational view, partly in section, of a scale installation in which a weigh platform constructed in accordance with this invention is used in association with force transmitting members between the load cells and the prestressed concrete platform.

FIG. 4 illustrates a scale installation in which the platform unit A rests on load cells via a force transmitting device which includes an upper part 14 and a lower part 15 with the upper part resting on the load application point of the load cell and the lower part supporting the scale platform. The upper and lower parts are connected by means of tension links 16 which are so arranged that the platform unit A may shift horizontally but always tends to swing back to a stable equalibrium position. This force transmitting mechanism is the subject of copending U.S. application Ser. No. 135,622, filed Apr. 20, 1971.

Figure 5:
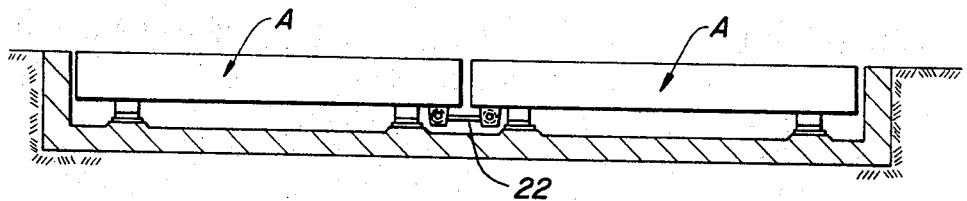
FIG. 5 is an elevational view showing a scale installation in which a pair of prefabricated, prestressed concrete platforms have been used to build up a long scale platform.

FIG. 5 illustrates a scale installation using two platforms or modules A arranged end to end to form an especially long weigh bridge. A connection in the form of a hinge means 22 is employed to join the adjacent ends of the two platform modules with the hinge means 22 maintaining the two platforms at a constant spaced distance and aligned at all times while at the same time allowing deflection of each module under load independently of each other. It will be appreciated that any form of hinge or flexure means may be employed for this purpose.

Figure 6A:
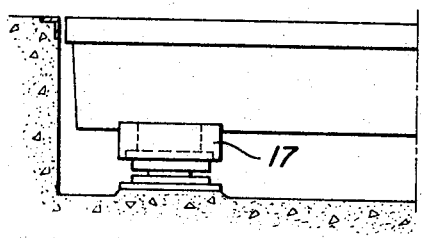
FIGS. 6a and 6b illustrate a prestressed concrete platform constructed in accordance with this invention and in which the platform is supported by cross beams at either end thereof.
Figure 6B:
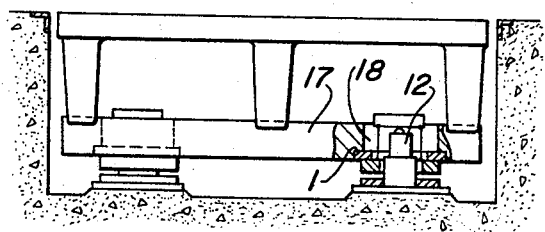

FIGS. 6a and 6b illustrate a scale installation similar to that shown in FIG. 4, but in which the platform unit A is supported at either end by cross beams 17. These cross beams can be made of prestressed concrete, reinforced concrete, or steel. If made of concrete, the mounting plates 1 for the load transmitting devices may be cast in these cross beams. Each beams is provided with two openings 18 for the load cells 12 so that the load cells remain accessible from the upper part of each beam.

While the cross beams 17 shown in FIGS. 6a and 6b are illustrated as separate elements, they can, of course, be cast in one piece with the platform unit A, if desired.

Figure 6C:
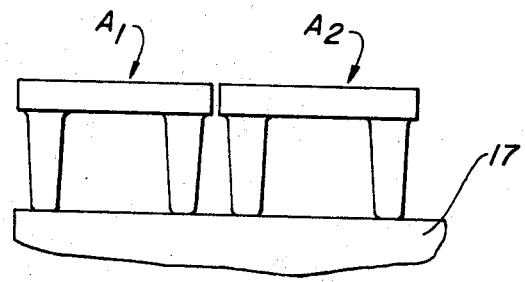
FIG. 6c is an end elevational view of a platform constructed by placing two platforms side by side.

The use of a cross beam 17 allows the platform unit A to be built up from two or more relatively narrow modules A1, A2 arranged side by side and supported on common cross beams as shown in FIG. 6c. As is apparent from the Figure, the two units A1, A2 each has a T—T cross sectional configuration.

It will be appreciated from the foregoing that platform scales constructed as described readily lend themselves to assembly line production in which the necessary mounting and application details may be mounted, cast in or grouted in the units during their manufacture. Because prestressed concrete modules lend themselves to manufacture in a factory environment, the mounting details can be positioned with great accuracy and at the most suitable point of the construction. Moreover, the platform modules can be used either as a single unit or, as shown in FIGS. 5 and 6c, as a plurality of units combined either end to end or side by side to product a prefabricated scale of any desired size and load rating. Still further, the tare weight per unit of a platform scale constructed according to this invention will be essentially the same as in conventional all steel weigh bridges; however, the cost will only be a fraction of the cost for the all steel design.

It will also be appreciated that by selecting a suitable quantity and dimensions for the longitudinal prestressing elements, and arranging them a suitable distance from each other, the platform units A can be adapted to the maximum permissible loading and by designing the reinforcement in the upper part of the units based on maximum permissible wheel force, a suitable relationship between the tare weight of the scale and the rated load can always be obtained.

While the invention has been described with reference to certain specific embodiments, neither the illustrated embodiments nor the terminology employed in describing them is intended to be limiting; rather it is intended to be limited only by the scope of the appended claims.

The embodiment of the invention in which an exclsive property or privilege is claimed are defined as follows:

1. A device for weighing of vehicles comprising an elongated concrete platform having a generally planar upper surface and at least a pair of longitudinal beams depending from the lower surface to define a T—T cross section, longitudinal pre-stressing means in each of said beams to provide a prestress to said concrete platform, and cross beam means at either end of said platform and extending transverse to said platform with said longitudinal beams being supported by said cross beam means, said cross beam means including means for cooperating with a plurality of discrete load sensing supporting means whereby said platform may be supported on load sensing supports.

2. The device of claim 1 wherein said platform comprises a plurality of concrete modules each having at least a pair of said longitudinal beams defining a T—T cross section.

3. The device of claim 1 and further including reinforcement means in the upper portion of said platform.

4. The device of claim 1 wherein said platform comprises at least a pair of concrete platform modules arranged side-by-side with each module having at least a pair of said longitudinal beams.

5. The device of claim 4 wherein a single cross beam means supports the adjacent ends of said concrete modules.

6. The device of claim 1 wherein said platform comprises at least a pair of concrete platform modules arranged end to end with each module having at least a pair of said longitudinal beams,
said cross beam means supporting the ends of each of said modules.

7. The device of claim 6 and further including hinge means flexibly interconnecting the adjacent ends of said modules.

8. A weigh device for weighing vehicles comprising an elongated concrete platform having a generally planar upper surface and at least a pair of longitudinal beams depending from the lower surface to define a T—T cross section,
longitudinal prestressing means in each of said beams to provide a pre-stress to said concrete platform,
cross beam means at either end of said platform and extending transverse to said platform with said longitudinal beams being supported by said cross beam means,
a plurality of discrete load sensing means, and
means for supporting each of said cross beam means on at least a pair of said load sensing means.

9. The weigh device of claim 8 wherein said supporting means for said cross beams includes means for permitting shifting movement of said platform relative to said load sensing means under the influence of external forces and the return of said platform to its initial position upon removal of the external forces.

10. The weigh device of claim 8 wherein said platform comprises at least a pair of pre-stressed concrete modules each having at least a pair of longitudinal beams.

11. The weigh device of claim 10 wherein said modules are arranged side by side with adjacent ends of said modules resting on a common cross beam means.

* * * * *